(12) United States Patent
Kawasato et al.

(10) Patent No.: US 7,481,991 B2
(45) Date of Patent: Jan. 27, 2009

(54) PROCESS FOR PRODUCING LITHIUM-CONTAINING COMPOSITE OXIDE FOR POSITIVE ELECTRODE FOR LITHIUM SECONDARY BATTERY

(75) Inventors: Takeshi Kawasato, Chigasaki (JP); Megumi Uchida, Chigasaki (JP); Naoshi Saito, Chigasaki (JP); Manabu Suhara, Chigasaki (JP)

(73) Assignee: Seimi Chemical Co., Ltd., Chigasaki (JP)

( * ) Notice: Subject to any disclaimer, the term of this patent is extended or adjusted under 35 U.S.C. 154(b) by 26 days.

(21) Appl. No.: 11/365,617

(22) Filed: Mar. 2, 2006

(65) Prior Publication Data

US 2006/0210879 A1    Sep. 21, 2006

Related U.S. Application Data

(63) Continuation of application No. PCT/JP2005/008796, filed on May 13, 2005.

(30) Foreign Application Priority Data

May 14, 2004    (JP) ............................. 2004-144846

(51) Int. Cl.
*C01D 1/02*    (2006.01)
*H01M 4/50*    (2006.01)
*H01M 4/52*    (2006.01)

(52) U.S. Cl. .................... 423/594.6; 429/223; 429/224; 429/231.95; 423/594.4; 252/182.1

(58) Field of Classification Search ....................... None
See application file for complete search history.

(56) References Cited

U.S. PATENT DOCUMENTS

| | | | | |
|---|---|---|---|---|
| 5,742,070 A | * | 4/1998 | Hayashi et al. | 252/182.1 |
| 2002/0037456 A1 | * | 3/2002 | Hosoya | 429/231.3 |
| 2003/0211235 A1 | * | 11/2003 | Suh et al. | 427/126.1 |

2006/0210879 A1    9/2006  Kawasato et al.

FOREIGN PATENT DOCUMENTS

| | | | |
|---|---|---|---|
| JP | 2000-128546 | | 5/2000 |
| JP | 2000-260432 | * | 9/2000 |
| JP | 2002-37630 | | 2/2002 |
| JP | 2002-37631 | | 2/2002 |
| JP | 2003-68298 | | 3/2003 |
| JP | 2004-119221 | * | 4/2004 |

OTHER PUBLICATIONS

U.S. Appl. No. 11/621,586, filed Jan. 10, 2007, Suhara, et al.
U.S. Appl. No. 11/372,003, filed Mar. 10, 2006, Kawasato, et al.
U.S. Appl. No. 11/365,617, filed Mar. 2, 2006, Kawasato et al.
U.S. Appl. No. 11/529,301, filed Sep. 29, 2006, Kawasato, et al.
U.S. Appl. No. 11/838,283, filed Aug. 14, 2007, Kawasato, et al.
U.S. Appl. No. 11/774,782, filed Jul. 9, 2007, Horichi, et al.
U.S. Appl. No. 11/952,185, filed Dec. 7, 2007, Kawasato, et al.
U.S. Appl. No. 11/942,208, filed Nov. 19, 2007, Saito, et al.
U.S. Appl. No. 11/940,689, filed Nov. 15, 2007, Saito, et al.

* cited by examiner

*Primary Examiner*—Jonathan Crepeau
*Assistant Examiner*—Tony Chuo
(74) *Attorney, Agent, or Firm*—Oblon, Spivak, McClelland, Maier & Neustadt, P.C.

(57) ABSTRACT

A process to produce a positive electrode active material for a lithium secondary battery, having a large volume capacity density and high safety, uniform coating properties, charge and discharge cyclic durability and low temperature characteristics even at a high charge voltage is disclosed.

The positive electrode active material is a lithium-containing composite oxide represented by the formula $Li_pN_xM_yO_zF_a$, wherein N is at least one element selected from the group consisting of Co, Mn and Ni, M is at least one element selected from the group consisting of Sn, Zn, Al, alkaline earth metal elements, and transition metal elements other than the N element, $0.9 \leq p \leq 1.1$, $0.97 \leq x \leq 1.00$, $0 \leq y \leq 0.03$, $1.9 \leq z \leq 2.1$, $x+y=1$ and $0 \leq a \leq 0.02$. The N element source powder having an average particle size of from 2 to 20 μm, is impregnated with the M element salt aqueous solution, and the prepared dry powder comprising the N element, M element, a lithium source and optionally a fluorine source is fired at from 700 to 1,050° C. in an oxygen-containing atmosphere.

11 Claims, No Drawings

US 7,481,991 B2

PROCESS FOR PRODUCING LITHIUM-CONTAINING COMPOSITE OXIDE FOR POSITIVE ELECTRODE FOR LITHIUM SECONDARY BATTERY

TECHNICAL FIELD

The present invention relates to a process for producing a lithium-containing composite oxide for a positive electrode for a lithium secondary battery, which has a large volume capacity density and high safety and is excellent in the charge and discharge cyclic durability and the low temperature characteristics, a positive electrode for a lithium secondary battery containing the produced lithium-containing composite oxide, and a lithium secondary battery.

BACKGROUND ART

Recently, as the portability and cordless tendency of instruments have progressed, a demand for a non-aqueous electrolyte secondary battery such as a lithium secondary battery which is small in size and light in weight and has a high energy density, has been increasingly high. As a positive electrode active material for the non-aqueous electrolyte secondary battery, a composite oxide of lithium and a transition metal such as $LiCoO_2$, $LiNiO_2$, $LiNi_{0.8}Co_{0.2}O_2$, $LiMn_2O_4$ or $LiMnO_2$, has been known.

Among them, a lithium secondary battery using a lithium-containing composite oxide ($LiCoO_2$) as a positive electrode active material and using a lithium alloy or carbon such as graphite or carbon fiber as a negative electrode, can obtain a high voltage at a level of 4V, whereby it has been widely used as a battery having a high energy density.

However, in the case of the non-aqueous type secondary battery using $LiCoO_2$ as a positive electrode active material, further improvement of the capacity density per unit volume of a positive electrode layer and the safety, has been desired. On the other hand, there has been a problem of deterioration of the cyclic properties such as gradual reduction of the battery discharge capacity due to repetitive charge and discharge cycles, a problem of the weight capacity density or substantial reduction of the discharge capacity at a low temperature.

In order to solve a part of these problems, it has been proposed in Patent Document 1 that the average particle size of $LiCoO_2$ as a positive electrode active material, be from 3 to 9 μm, the volume occupied by a group of particles having a particle size of from 3 to 15 μm, be at least 75% of the total volume, and the intensity ratio of the diffraction peaks at 2θ=about 19° and 2θ=45° as measured by means of X-ray diffraction using CuKα as a radiation source, be of a specific value, so that it becomes an active material excellent in the coating properties, the self-discharge properties and the cyclic properties. Further, in Patent Document 1, it has been proposed that the positive electrode active material is preferably one which does not substantially have such a particle size distribution that the particle size of $LiCoO_2$ is 1 μm or smaller or 25 μm or larger. With such a positive electrode active material, the coating properties and the cyclic properties have been improved, but, the safety, the volume capacity density and the weight capacity density, have not yet been fully satisfactory.

Further, in order to solve the problem related to the battery characteristics, Patent Document 2 proposes to replace 5 to 35% of Co atoms with W, Mn, Ta, Ti or Nb to improve the cyclic properties. Further, Patent Document 3 proposes to use hexagonal $LiCoO_2$ as a positive electrode active material to improve the cyclic properties, wherein the c axis length of the lattice constant is at most 14.051 Å, and the crystal lattice size of (110) direction of the crystal lattice is from 45 to 100 nm.

Further, Patent Document 4 proposes that a lithium composite oxide of the formula $Li_xNi_{1-m}N_mO_2$ (wherein 0<x<1.1, 0≦m≦1), of which the primary particles are plate-like or columnar, the ratio of (volume standard cumulative 95% size–volume standard cumulative 5% size)/(volume standard cumulative 5% size) is at most 3, and further, the average particle size is from 1 to 50 μm, has a high initial discharge capacity per weight and further is excellent in the charge and discharge cyclic durability.

Further, Patent Document 5 proposes to lithiate a cobalt compound powder in the form of secondary particles with an average particle size of 0.5 to 30 μm formed by agglomeration of primary particles of cobalt hydroxide, cobalt oxyhydroxide or cobalt oxide with an average particle size of from 0.01 to 2 μm. However, also in this case, it is not possible to obtain a positive electrode material having a high volume capacity density, and further, the material is insufficient also with respect to the cyclic properties, the safety or the large current discharge properties.

Patent Document 6 and Patent Document 7 propose a method of covering lithium cobalt oxide particles with a different metal element by a sol-gel process, but the covered lithium cobalt oxide is unsatisfactory in the battery performance i.e. the discharge capacity, the charge and discharge cyclic durability and the safety. Further, although an alkoxide of the different metal element as a starting material may be suitable at the laboratory level, it is too expensive to employ industrially. Further, as the alkoxide is very sensitive to water and is likely to be hydrolyzed, such a reaction apparatus that the alkoxide will not be influenced by water in the air will be required, and the cost of equipment tends to be high, thus raising the cost, and such is problematic economically.

Further, Patent Document 8 proposes to react a colloidal coating liquid obtained by adding water to $(NH_4)_2HPO_4$ and $Al(NO_3)_3.3H_2O$ with lithium cobalt oxide particles. However, the covered lithium cobalt oxide is unsatisfactory in the battery performance i.e. the discharge capacity, the charge and discharge cyclic durability and the safety.

As described above, in the prior art, with respect to a lithium secondary battery employing a lithium composite oxide as a positive electrode active material, it has not yet been possible to obtain one which sufficiently satisfies all of the volume capacity density, the safety, the coating uniformity, the cyclic properties and further the low temperature characteristics.

Patent Document 1: JP-A-6-243897
Patent Document 2: JP-A-3-201368
Patent Document 3: JP-A-10-312805
Patent Document 4: JP-A-10-72219
Patent Document 5: JP-A-2002-60225
Patent Document 6: JP-A-2000-306584
Patent Document 7: JP-A-2002-279991
Patent Document 8: JP-A-2003-7299

DISCLOSURE OF THE INVENTION

It is an object of the present invention to provide a process for producing a lithium-containing composite oxide such as a lithium-cobalt composite oxide for a positive electrode for a lithium secondary battery, which has a large volume capacity density and high safety, and is excellent in the charge and discharge cyclic durability and is further excellent in the low temperature characteristics, a positive electrode for a lithium secondary battery containing the produced lithium-containing composite oxide, and a lithium secondary battery.

MEANS FOR SOLVING THE PROBLEMS

The present inventors have conducted extensive studies and as a result, accomplished the present invention based on the following discoveries. Namely, a lithium-containing composite oxide such as lithium cobalt oxide is basically excellent in the volume capacity density. However, its crystal structure repeatedly expands and contracts by the phase transition between the hexagonal system and the monoclinic system accompanying the insertion and extraction of lithium at the time of charge and discharge, whereby the crystal structure is broken, and the cyclic properties is deteriorated. It has been attempted to overcome this problem, as mentioned above, by replacing a part of cobalt in the lithium cobalt oxide with another additional element such as W, Mn, Ta, Ti or Nb to stabilize the crystal structure.

However, in the case of the above conventional method, an expected result has not necessarily been achieved as shown in Examples (Comparative Examples) 4 and 5 as described hereinafter.

The present inventors have found a process for producing a lithium-containing composite oxide for a lithium secondary battery, which has a large volume capacity density, high safety and a high average operating voltage and is excellent in the charge and discharge cyclic durability, industrially at a low cost and safely, by using as an M element source an aqueous solution of M element salt of a specific carboxylic acid and by impregnating an N element source powder having a specific average particle size with the aqueous solution of M element salt of the carboxylic acid, and achieved the above object.

Namely, the present invention is essentially directed to the following.

(1) A process for producing a lithium-containing composite oxide for a positive electrode for a lithium secondary battery, the lithium-containing composite oxide being represented by the formula $Li_pN_xM_yO_zF_a$ (wherein N is at least one element selected from the group consisting of Co, Mn and Ni, M is at least one element selected from the group consisting of Sn, Zn, Al, alkaline earth metal elements, and transition metal elements other than N, $0.9 \leq p \leq 1.1$, $0.97 \leq x < 1.00$, $0 < y \leq 0.03$, $1.9 \leq z \leq 2.1$, $x+y=1$ and $0 \leq a \leq 0.02$), which comprises firing a mixture of a lithium source and an N element source, and if necessary, an M element source and a fluorine source, at from 700° C. to 1050° C. in an oxygen-containing atmosphere, characterized by using as the N element source a powder obtained by impregnating an N element source powder having an average particle size (D50) of from 2 to 20 μm with an aqueous solution of a carboxylic acid having totally two or more carboxylic acid groups or carboxylic acid groups and hydroxyl groups in its molecule and if necessary, containing an M element, or its salt, followed by drying.

(2) The process according to the above (1), wherein the carboxylic acid is a carboxylic acid having from 2 to 8 carbon atoms.

(3) The process according to the above (1) or (2), wherein the carboxylic acid is at least one member selected from the group consisting of citric acid, lactic acid, oxalic acid and tartaric acid.

(4) The process according to any one of the above (1) to (3), wherein the aqueous solution of the carboxylic acid or its salt has a pH of from 2 to 12.

(5) The process according to any one of the above (1) to (4), wherein the N element source powder is impregnated with an aqueous solution of M element salt of the carboxylic acid and dried to remove water, and then dryly mixed with a lithium source powder, and if necessary, the fluorine source, and the obtained powder mixture is fired at from 850 to 1050° C. in an oxygen-containing atmosphere.

(6) The process according to any one of the above (1) to (4), wherein the N element source powder is impregnated with an aqueous solution of M element salt of the carboxylic acid in the presence of a lithium source powder, and if necessary, the fluorine source, and dried to remove water, and the powder mixture thus obtained is fired at from 850 to 1050° C. in an oxygen-containing atmosphere.

(7) The process according to any one of the above (1) to (6), wherein the M element is at least one member selected from the group consisting of Ti, Zr, Hf, Nb, Ta, Mg, Sn, Zn and Al.

(8) The process according to any one of the above (1) to (7), wherein the M element is at least Al and Mg, the Al/Mg atomic ratio is from 1/3 to 3/1, and $0.005 \leq y \leq 0.025$.

(9) The process according to any one of the above (1) to (7), wherein the M element is at least Mg and M2 (wherein M2 is at least one element selected from the group consisting of Ti, Zr, Ta and Nb), the M2/Mg atomic ratio is from 1/40 to 2/1, and $0.005 \leq y \leq 0.025$.

(10) The process according to any one of the above (1) to (9), wherein of the lithium-containing composite oxide powder, the integral breadth of the diffraction peak on (110) plane in the vicinity of $2\theta=66.5 \pm 1°$ is from 0.08 to 0.14° as measured by means of X-ray diffraction in which CuKα is used as a radiation source, the surface area is from 0.2 to 0.6 m²/g, and the heat generation starting temperature is at least 160° C.

(11) A positive electrode for a lithium secondary battery containing a lithium-containing composite oxide produced by the process as defined in any one of the above (1) to (10).

(12) A lithium secondary battery using the positive electrode as defined in the above (11).

EFFECTS OF THE INVENTION

According to the present invention, a process for producing a lithium-containing composite oxide such as a lithium-cobalt composite oxide for a positive electrode for a lithium secondary battery, which has a large volume capacity density and high safety and is excellent in the charge and discharge cyclic durability and is further excellent in the low temperature characteristics, a positive electrode for a lithium secondary battery containing the lithium-containing composite oxide and a lithium secondary battery are provided.

BEST MODE FOR CARRYING OUT THE INVENTION

The lithium-containing composite oxide for a positive electrode for a lithium secondary battery to be produced by the present invention is represented by the formula $Li_pN_xM_yO_zF_a$. In the formula, p, x, y, z and a are as defined above. Particularly, p, x, y, z and a are preferably as follows. $0.97 \leq p \leq 1.03$, $0.98 \leq x < 1.00$, $0.0005 \leq y \leq 0.02$, $1.95 \leq z \leq 2.05$, $x+y=1$ and $0.001 \leq a \leq 0.01$. Here, when a is larger than 0, it is a composite oxide having some of its oxygen atoms substituted by fluorine atoms. In such a case, the safety of the obtained positive electrode active material will be improved.

The N element is at least one element selected from the group consisting of Co, Mn and Ni, and it is preferably Co, Ni, Co and Ni, Mn and Ni, or Co, Ni and Mn. The M element is at least one element selected from the group consisting of aluminum, tin, Zinc, alkaline earth metals and transition metal elements other than the N element. The transition metal elements represent transition metals of Group 4, Group 5, Group 6, Group 7, Group 8, Group 9, Group 10 and Group 11 of the Periodic Table. Among them, the M element is preferably at least one element selected from the group consisting of Ti, Zr, Hf, Nb, Ta, Mg, Sn, Zn and Al. Particularly, from the viewpoint of the volume development properties, the safety, the cyclic durability, etc., preferred is Ti, Zr, Nb, Ta, Mg or Al.

In the present invention, it is particularly preferred that the M element is Al and Mg, the Al/Mg atomic ratio is preferably from 1/3 to 3/1, particularly preferably from 2/3 to 3/2, and y is preferably $0.005 \leq y \leq 0.025$, particularly preferably $0.01 \leq y \leq 0.02$, whereby the battery performance i.e. the initial weight capacity density, the initial volume capacity density, the safety and the charge and discharge cyclic stability will be well balanced. Further, in the present invention, it is particularly preferred that the M element is Mg and M2 (M2 is at least one element selected from the group consisting of Ti, Zr, Ta and Nb), the M2/Mg atomic ratio is preferably from 1/40 to 2/1, particularly preferably from 1/30 to 1/5, and y is preferably $0.005 \leq y \leq 0.025$, particularly preferably $0.01 \leq y \leq 0.02$, whereby the battery performance i.e. the initial weight capacity density, the initial volume capacity density, the safety and the charge and discharge cyclic stability will be well balanced.

Further, in the present invention, it is particularly preferred that the M element is Zr and Mg, the Zr/Mg atomic ratio is preferably from 1/40 to 2/1, particularly preferably from 1/30 to 1/5, and y is preferably $0.005 \leq y \leq 0.025$, particularly preferably $0.01 \leq y \leq 0.02$, whereby the battery performance i.e. the initial weight capacity density, the initial volume capacity density, the safety and the charge and discharge cyclic stability will be well balanced.

Still further, in the present invention, it is particularly preferred that the M element is Mg and Al and further Zr coexists, whereby the battery performance i.e. the initial weight capacity density, the initial volume capacity density, the safety and the charge and discharge cyclic stability will be particularly well balanced. In such a case, Zr coexists preferably in an amount of from 1/2 to 1/20 based on the total number of mols of Mg and Al.

In the present invention, in a case where the above M element and/or fluorine is contained, each of the M element and fluorine is preferably present on the surface of lithium-containing composite oxide particles. By the presence of these elements on the surface, the important battery characteristics such as the safety and the charge and discharge cyclic properties can be improved by an addition of a small amount without bringing about the reduction of the battery performance. The presence of these elements on the surface can be judged by carrying out a spectroscopic analysis such as an XPS analysis with respect to the lithium-containing composite oxide particles.

In the present invention, an N element source powder having an average particle size (D50) of from 2 to 20 μm is impregnated with an aqueous solution of a carboxylic acid having totally two or more carboxylic acid groups or carboxylic acid groups and hydroxyl groups in its molecule and an M element source or an aqueous solution of a carboxylate of the M element. A carboxylic acid having only one carboxylic acid group and having no hydroxyl group coexisting in its molecule, such as acetic acid or propionic acid, is not preferred in view of the low solubility of the M element source. A carboxylic acid having a plurality of carboxylic acid groups and having a hydroxyl group coexisting in addition to the carboxylic acid groups, is preferred, whereby when it is converted to a salt such as M element salt, its solubility can be increased. Particularly, a carboxylic acid having a molecular structure with from 2 to 4 carboxylic acid groups, and further having from 1 to 4 hydroxyl groups coexisting, is preferred, whereby the solubility can be increased. The carboxylic acid preferably has from 2 to 8 carbon atoms. If it has 9 or more carbon atoms, the solubility of the M element source tends to decrease. It has particularly preferably from 2 to 6 carbon atoms.

The carboxylic acid is preferably citric acid, tartaric acid, oxalic acid, malonic acid, malic acid, succinic acid, racemic acid or lactic acid, and it is particularly preferably citric acid, tartaric acid, lactic acid or oxalic acid, which can make the solubility of the M element source particularly high and is available at a relatively low cost. In a case where a carboxylic acid having high acidity such as oxalic acid is used, the N element is likely to be dissolved if the aqueous solution has a pH less than 2, and thus it is preferred to add a base such as ammonia to bring the pH from 2 to 12.

The concentration of the specific carboxylic acid or its salt in the aqueous solution to be used in the present invention is preferably high since it is necessary to remove the water medium by drying in the subsequent steps. However, if the concentration is too high, the viscosity tends to be high, and the uniform mixing properties with other element-containing compound powders forming the positive electrode active material tend to decrease. Thus, it is preferably from 1 to 30 wt %, particularly preferably from 4 to 20 wt %.

To a medium to form the aqueous solution of the carboxylic acid or its salt, e.g. a polyol having a complex-forming capacity may be contained if necessary so as to increase the solubility of the M element in the aqueous solution. The polyol may, for example, be ethylene glycol, propylene glycol, diethylene glycol, dipropylene glycol, polyethylene glycol, butanediol or glycerol, and in such a case, the content is preferably from 1 to 20 wt %.

As the N element source to be used in the present invention, in a case where the N element is cobalt, cobalt carbonate, cobalt hydroxide or cobalt oxyhydroxide, or cobalt oxide is preferably used. Particularly preferred is cobalt hydroxide or cobalt oxyhydroxide, with which the performance is likely to be developed. Further, in a case where the N element is nickel, nickel hydroxide, nickel oxyhydroxide or nickel oxide is preferably used. Further, in a case where the N element is manganese, manganese carbonate is preferably used.

Further, in a case where the N element source is a compound containing nickel and cobalt, $Ni_{0.8}Co_{0.2}OOH$, $Ni_{0.8}Co_{0.2}(OH)_2$ may, for example, be preferably mentioned, in a case where the N element source is a compound containing nickel and manganese, $Ni_{0.5}Mn_{0.5}OOH$ may, for example, be preferably mentioned, and in a case where the N element source is a compound containing nickel, cobalt and manganese, $Ni_{0.4}Co_{0.2}Mn_{0.4}(OH)_2$ or $Ni_{1/3}Co_{1/3}Mn_{1/3}OOH$ may, for example, be preferably mentioned.

As the N element source, a powder having an average particle size (D50) of from 2 to 20 μm is used. The average particle size (D50) means a particle size corresponding to the volume basis cumulative 50% size. If the average particle size is less than 2 μm, the packing properties of the positive electrode powder tend to decrease. Further, if the average particle size exceeds 20 μm, no uniform coated electrode will be obtained, or the large current discharge properties tend to decrease. The average particle size is preferably from 4 to 16 μm. In the present invention, an N element source in the form of secondary particles formed by agglomeration of primary particles is suitably used.

As the lithium source to be used in the present invention, lithium carbonate or lithium hydroxide is preferably used.

Particularly preferred is lithium carbonate which is available at a low cost. As the fluorine source, a metal fluoride is preferred, and LiF, $MgF_2$, etc. is particularly preferred.

The M element source to be used in the present invention may be an inorganic acid salt such as a solid oxide, hydroxide, carbonate or nitrate, an organic acid salt such as an acetate, oxalate, citrate, lactate, tartrate, malate or malonate, or an organic metal chelate complex or a compound having a metal alkoxide stabilized with e.g. a chelate. However, in the present invention, the M element source is preferably one which is uniformly soluble in the aqueous solution by the above specific carboxylic acid, more preferably an oxide, a hydroxide, an oxyhydroxide, a water soluble carbonate, a nitrate, an acetate, an oxalate or a citrate. Among them, a citrate is preferred which has a high solubility. Further, in an aqueous oxalate or citrate solution having a low pH, a cobalt salt or the like may be dissolved in some cases, and in such a case, it is particularly preferred to add ammonia to the aqueous solution so as to make the solution be an aqueous solution having a pH of from 2 to 12.

In the present invention, the N element source powder having an average particle size of from 2 to 20 μm is impregnated with an aqueous solution of the carboxylic acid having totally two or more carboxylic acid groups or carboxylic acid groups and hydroxyl groups in its molecule and the M element source or an aqueous solution of a carboxylate of the M element. The carboxylate is preferably the M element source. Several means are selected depending upon the manner of impregnating the N element source powder. For example, in a case where an aqueous solution of the M element salt of the carboxylic acid is used, the following means (A) and (B) may be mentioned as the preferred manners.

(A) The N element source powder is impregnated with the aqueous solution of the M element salt of the carboxylic acid and dried to remove water, and then drily mixed with the lithium source powder and if necessary, the fluorine source, and the powder mixture thus obtained is fired at from 850 to 1,050° C. in an oxygen-containing atmosphere.

(B) The N element source powder is impregnated with the aqueous solution of the M element salt of the carboxylic acid in the presence of the lithium source powder, and if necessary, the fluorine source, and dried to remove water, and the powder mixture thus obtained is fired at from 850 to 1,050° C. in an oxygen-containing atmosphere.

In the means (A) and (B), the M element source may be used not as the aqueous solution of the M element salt of the carboxylic acid, but part of or the entire M element source may be used as an M element powder. In a case where the aqueous solution of the M element salt of the carboxylic acid is not used, an aqueous solution of the carboxylic acid or another salt is used. Further, in a case where the respective element sources for the lithium-containing composite oxide are used as powders, the average particle size of each of these powders is not particularly limited, but is preferably from 0.1 to 20 μm, particularly preferably from 0.5 to 15 μm so that the powders are well mixed. The mixture ratio of the M element source is adjusted to achieve the desired ratio of each element within a range of the above $Li_pN_xM_yO_zF_a$ as the formula of the positive electrode active material to be produced in the present invention.

As a method of impregnating the N element source powder with the aqueous solution of the M element salt of the carboxylic acid in the above means (A) and (B), it is possible to spray the aqueous solution over the powder for impregnation. Otherwise, it is preferred to put the powder in the aqueous solution in a tank, followed by stirring for impregnation, or it is more preferred to sufficiently uniformly mix them so as to form a slurry by using e.g. a twin screw kneader, an axial mixer, a paddle mixer or a turbulizer. The solid content concentration in the slurry is preferably high so long as uniform mixing is achieved, but usually the solid/liquid ratio is suitably from 50/50 to 90/10, particularly preferably from 60/40 to 80/20.

Removal of the water medium from the obtained mixture is carried out by drying at preferably from 50 to 200° C., particularly preferably from 80 to 120° C. usually for 1 to 10 hours. The water medium in the mixture is not necessarily completely removed in this stage since it will be removed in the subsequent firing step, but it is preferably removed as far as possible since a large quantity of energy will be required to evaporate water in the firing step. As an industrial method of removing the water medium, a spray dryer, a flash dryer, a belt dryer, a paddle dryer or a twin screw dryer may, for example, be mentioned, and a twin screw dryer is particularly preferred. The twin screw dryer may, for example, be "THERMOPROCESSOR" (HOSOKAWA MICRON CORPORATION) or "Paddle Dryer" (NARA MACHINERY CO., LTD.)

Firing after removal of the water medium is carried out, in the above means (A) and (B), at from 700 to 1,050° C. in an oxygen-containing atmosphere. If the firing temperature is lower than 700° C., formation of the composite oxide tends to be incomplete. On the other hand, if it exceeds 1,050° C., the charge and discharge cyclic durability and the initial capacity tend to be low. The firing temperature is particularly preferably from 850 to 1,000° C.

With respect to the lithium-containing composite oxide thus produced, the average particle size D50 is preferably from 5 to 15 μm, particularly preferably from 8 to 12 μm, the specific surface area is preferably from 0.2 to 0.6 $m^2/g$, particularly preferably from 0.3 to 0.5 $m^2/g$, the integral breadth of the diffraction peak on (110) plane in the vicinity of $2\theta=66.5\pm1°$ as measured by means of X-ray diffraction in which CuKα is used as a radiation source, is preferably from 0.08 to 0.14°, particularly preferably from 0.08 to 0.12°, and the press density is preferably from 3.05 to 3.60 $g/cm^3$, particularly preferably from 3.10 to 3.50 $g/cm^3$. Further, in the lithium-containing composite oxide of the present invention, the remaining alkali amount contained is preferably at most 0.03 wt %, particularly preferably at most 0.01 wt %.

In a case where a positive electrode for a lithium secondary battery is produced from such a lithium-containing composite oxide, the powder of such a composite oxide is mixed with a binder material and a carbon type electroconductive material such as acetylene black, graphite or ketjenblack and formed into a slurry or a kneaded product by using a solvent or a dispersion medium, which is supported on a positive electrode current collector such as an aluminum foil or a stainless steel foil by e.g. coating to form a positive electrode for a lithium secondary battery. As the above binder material, polyvinylidene fluoride, polytetrafluoroethylene, polyamide, carboxymethyl cellulose or an acrylic resin may, for example, be preferably employed.

In a lithium secondary battery using the lithium-containing composite oxide of the present invention as the positive electrode active material, e.g. a film of a porous polyethylene or a porous polypropylene may be used as the separator. Further, as the solvent of the electrolytic solution of the battery, various solvents may be used. However, a carbonate ester is preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the present invention, the carbonate ester may be used alone or by mixing at least two types. Further, it may be used by mixing with another solvent. Further, according to the material of the negative electrode active material, if the chain carbonate ester is used together with the cyclic carbonate ester, there is a case where the discharge properties, the cyclic durability or the charge and discharge efficiency can be improved.

Further, in the lithium secondary battery using the lithium-containing composite oxide of the present invention as the positive electrode active material, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolytic solvent or the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. The lithium salt as the solute is preferably added at a concentration of from 0.2 to 2.0 mol/L (liter) to the electrolytic solvent or the polymer electrolyte. If the concentration departs from this range, ionic conductivity will decrease, and the electrical conductivity of the electrolyte will decrease. More preferably, it is from 0.5 to 1.5 mol/L.

In the lithium battery using the lithium-containing composite oxide of the present invention as the positive electrode active material, as the negative electrode active material, a material which can occlude and discharge lithium ions may be used. The material forming the negative electrode active material is not particularly limited, however, lithium metal, a lithium alloy, a carbon material, an oxide comprising, as a main body, a metal of Group 14 or Group 15 of the Periodic Table, a carbon compound, a silicon carbide compound, a silicone oxide compound, titanium sulfide or a boron carbide compound may, for example, be mentioned. As the carbon material, an organic material which is subjected to thermal decomposition under various thermal decomposition conditions, artificial graphite, natural graphite, soil graphite, exfoliated graphite or squamation graphite etc. can be used. Further, as the oxide, a compound comprising tin oxide as a main body can be used. As the negative electrode current collector, a copper foil, a nickel foil etc. can be used. The negative electrode is produced preferably by kneading the active material with an organic solvent to form a slurry, which is coated on the metal foil current collector, dried and pressed.

The shape of the lithium battery using the lithium-containing composite oxide of the present invention as the positive electrode active material is not particularly limited. Sheet, film, folding, winding type cylinder with bottom or button shape etc. is selected according to use.

EXAMPLES

Now, the present invention will be explained in further detail with reference to Examples. However, the present invention is by no means restricted to such specific Examples.

Example 1

A mixed solution of a cobalt sulfate aqueous solution with ammonium hydroxide and a caustic soda aqueous solution were continuously mixed, whereby a cobalt hydroxide slurry was continuously prepared by a known method, followed by steps of agglomeration, filtration and drying to obtain a cobalt hydroxide powder. As measured by means of powder X-ray diffraction in which CuKα ray was used as a radiation source, of the obtained cobalt hydroxide, the integral breadth of the diffraction peak on (001) plane in the vicinity of $2\theta=19\pm1°$ was 0.27°, the integrated breadth of the diffraction peak on (110) plane in the vicinity of $2\theta=38°\pm1$ was 0.23°. As a result of observation by scanning electron microscope, the particles were found to be ones having fine particles agglomerated to form substantially spherical secondary particles. As a result of particle size distribution analysis on the volume basis calculated from image analysis of observation by scanning electron microscope, the average particle size D50 was 17.5 µm, D10 was 7.1 µm and D90 was 26.4 µm. The cobalt content of cobalt hydroxide was 61.5%.

194.71 g of the above cobalt oxide and 76.18 g of a lithium carbonate powder having a specific surface area of 1.2 m²/g were mixed.

On the other hand, 1.50 g of ammonia (26% ammonia water) was added to 1.97 g of a commercial magnesium carbonate powder, 2.88 g of citric acid and 137.20 g of water to obtain an aqueous solution of a citrate having magnesium uniformly dissolved therein, and having a pH of 9.5. The aqueous solution was added to the above mixture of cobalt hydroxide with lithium carbonate and formed into a slurry.

The slurry was dehydrated in a dryer at 120° C. for 2 hours and then fired in the air at 950° C. for 12 hours to obtain $LiCo_{0.99}Mg_{0.01}O_2$. The fired product was crushed, and the particle size distribution of a lithium-containing composite oxide powder formed by agglomeration of primary particles was measured in a water solvent by using a laser scattering type particle size distribution measuring apparatus and as a result, the average particle size D50 was 17.3 µm, D10 was 7.2 µm and D90 was 26.1 µm, and a substantially spherical lithium-containing composite oxide powder having a specific surface area of 0.35 m²/g as obtained by means of BET method, was obtained.

With respect to the lithium-containing composite oxide powder, an X-ray diffraction spectrum was obtained by using an X-ray diffraction apparatus (RINT2100 model, manufactured by Rigaku Corporation). In powder X-ray diffraction in which CuKα ray was used, the integral breadth of the diffraction peak on (110) plane in the vicinity of $2\theta=66.5\pm1°$ was 0.114°. The press density (apparent density when pressed under a pressure of 0.3 t/cm²) of this powder was 3.14 g/cm³. 10 g of the lithium-containing composite oxide powder was dispersed in 100 g of pure water, and after filtration, the remaining alkali amount was obtained by potentiometric titration with 0.1 N HCl and found to be 0.02 wt %.

The above lithium-containing composite oxide powder, acetylene black and a polyvinylidene fluoride powder were mixed in a mass ratio of 90/5/5, and N-methylpyrrolidone was added to form a slurry, which was applied on one side of an aluminum foil with a thickness of 20 µm by a doctor blade. After drying, roll pressing was carried out five times to obtain a positive electrode sheet for a lithium battery. Using one punched out from the positive electrode sheet as a positive electrode, using a metal lithium foil having a thickness of 500 µm as a negative electrode, using a nickel foil of 20 µm as a negative electrode current collector, using a porous polypropylene having a thickness of 25 µm as a separator and using a $LiPF_6$/EC+DEC(1:1) solution (it means a mixed solution of EC and DEC in a mass ratio (1:1) of which the solute is $LiPF_6$, the same applies to solvents as mentioned hereinafter) at a concentration of 1M as an electrolytic solution, a pair of simplifying sealed cell type lithium batteries made of stainless steel were assembled in an argon grove box.

A piece of the battery was charged up to 4.3 V at a load current of 75 mA per 1 g of the positive electrode active material at 25° C., and discharged down to 2.5 V at a load current of 75 mA per 1 g of the positive electrode active material, whereby the initial discharge capacity was obtained. Further, the density of the electrode layer was obtained. Further, with this battery, the charge and discharge cyclic test was sequentially carried out 30 times. As a result, the initial weight capacity density of the positive electrode layer at from 2.5 to 4.3 V at 25° C. was 161 mAh/g, and the capacity retention after 30 times of charge and discharge cycle was 98.5%.

Further, the other battery was charged for 10 hours at 4.3 V, and then broken down in the argon grove box. The positive electrode body sheet was picked up after charge, and after the positive electrode body sheet was washed, it was punched out at a radius of 3 mm, and then sealed in an aluminum capsule with EC. And then, it was heated at a rate of 5° C./min by using a scanning differential calorimeter, whereby the heat generation starting temperature was measured. As a result, the heat generation starting temperature of the 4.3 V charged product was 166° C.

Example 2

0.99 g of magnesium carbonate, 2.43 g of commercial aluminum citrate and 2.51 g of citric acid were added and dissolved in 174.56 g of pure water to obtain an aqueous solution of a citrate having magnesium and aluminum uniformly dissolved, and having a pH of 2.9. The aqueous solution was mixed with a mixture of 194.60 g of cobalt hydroxide with 76.14 g of lithium carbonate obtained in the same manner as in Example 1 and formed into a slurry. The solid content concentration in the slurry was 60 wt %.

The slurry was dehydrated in a dryer at 120° C. for 2 hours and then fired in the air at 950° C. for 12 hours to obtain $LiCo_{0.99}Mg_{0.005}Al_{0.005}O_2$. The fired product was crushed, and the particle size distribution of the lithium-containing composite oxide powder formed by agglomeration of primary particles was measured in a water solvent by using a laser scattering type particle size distribution measuring apparatus and as a result, the average particle size D50 was 17.5 µm, D10 was 7.1 µm, and D90 was 25.9 µm, and a substantially spherical lithium-containing composite oxide having a specific surface area of 0.35 m$^2$/g was obtained. In the powder X-ray diffraction, the integral breadth of the diffraction peak on (110) plane at 2θ=66.5±1° was 0.114°. The press density of this powder was 3.08 g/cm$^3$. 10 g of the lithium composite oxide powder was dispersed in 100 g of pure water, and after filtration, the remaining alkali amount was obtained by potentiometric titration with 0.1 N HCl and found to be 0.02 wt %.

By using the lithium-containing composite oxide powder, in the same manner as in Example 1, a positive electrode body was produced, batteries were assembled, and the battery characteristics were measured. As a result, the initial weight capacity density of the positive electrode layer at from 2.5 to 4.3 V at 25° C. was 161 mAh/g, and the capacity retention after 30 times of charge and discharge cycle was 99.0%. Further, the heat generation starting temperature of the 4.3 V charged product was 169° C.

Example 3

A cobalt hydroxide powder was mixed with an aqueous solution of a citrate prepared in the same manner as in Example 2 to obtain a slurry. The obtained slurry was dried at 100° C. for 10 hours to remove water to obtain a cobalt hydroxide powder having the cobalt hydroxide powder uniformly impregnated with aluminum and magnesium. 74.62 g of a lithium carbonate powder and 1.07 g of a lithium fluoride powder were weighed and mixed with the obtained cobalt hydroxide powder, and the mixture was fired under the same conditions as in Example 1 to obtain $LiCo_{0.990}Mg_{0.005}Al_{0.005}O_{1.995}F_{0.005}$.

The fired product was crushed, and the particle size distribution of the lithium-containing composite oxide powder formed by agglomeration of primary particles was measured in a water solvent by using a laser scattering type particle size distribution measuring apparatus and as a result, the average particle size D50 was 17.2 µm, D10 was 7.0 µm, and D90 was 25.7 µm, and a substantially spherical lithium-containing composite oxide powder having a specific surface area of 0.38 m$^2$/g as obtained by BET method was obtained. With respect to the lithium-containing composite oxide powder, an X-ray diffraction spectrum was obtained by using an X-ray diffraction apparatus (RINT2100 model, manufactured by Rigaku Corporation). In powder X-ray diffraction using CuKα ray, the integral breadth of the diffraction peak on (110) plane in the vicinity of 2θ=66.5±1° was 0.110°. The press density of this powder was 3.15 g/cm$^3$. 10 g of the lithium-cobalt composite oxide powder was dispersed in 100 g of pure water, and after filtration, the remaining alkali amount was obtained by potentiometric titration with 0.1 N HCl and found to be 0.01 wt %.

By using the lithium-containing composite oxide powder, in the same manner as in Example 1, a positive electrode body was produced, batteries were assembled, and the battery characteristics were measured. As a result, the initial weight capacity density of the positive electrode layer was 162 mAh/g, and the capacity retention after 30 times of charge and discharge cycle was 99.5%. The heat generation starting temperature of the 4.3 V charged product was 174° C.

Example 4 (Comparative Example)

In the same manner as in Example 1 except that no aqueous solution was added, 195.8 g of cobalt hydroxide and 75.85 g of lithium carbonate were mixed and fired to obtain a lithium-containing composite oxide represented by $LiCoO_2$. The fired product was crushed, and the particle size distribution of the lithium-containing composite oxide powder formed by agglomeration of primary particles was measured in a water solvent by using a laser scattering type particle size distribution measuring apparatus and as a result, the average particle size D50 was 17.3 µm, D10 was 7.8 µm, and D90 was 26.2 µm, and an aggregated lithium-containing composite oxide powder having a specific surface area of 0.30 m$^2$/g as obtained by BET method was obtained. With respect to the lithium-containing composite oxide powder, an X-ray diffraction spectrum was obtained by using an X-ray diffraction apparatus (RINT2100 model, manufactured by Rigaku Corporation). In powder X-ray diffraction using CuKα ray, the integral breadth of the diffraction peak on (110) plane in the vicinity of 2θ=66.5±1° was 0.110°. The press density of this powder was 3.00 g/cm$^3$. The integral breadth of the diffraction peak on (110) plane in the vicinity of 2θ=66.5±1° was 0.115°.

By using the lithium-containing composite oxide powder, in the same manner as in Example 1, a positive electrode body was produced, batteries were assembled, and the battery characteristics were measured. As a result, the initial weight capacity density of the positive electrode layer was 161 mAh/g, and the capacity retention after 30 times of charge and discharge cycle was 96.3%. The heat generation starting temperature of the 4.3 V charged product was 158° C.

Example 5 (Comparative Example)

LiCo$_{0.99}$Mg$_{0.01}$O$_2$ was obtained in the same manner as in Example 1 except that 1.20 g of a magnesium hydroxide powder, 194.71 g of cobalt hydroxide and 76.18 g of lithium carbonate were drily mixed and fired, instead of using the aqueous solution. The press density of the lithium-containing composite oxide powder was 3.00 g/cm$^3$.

Further, by using the lithium-containing composite oxide powder, in the same manner as in Example 1, a positive electrode body was produced, batteries were assembled, and the battery characteristics were measured. As a result, the initial weight capacity density of the positive electrode layer was 161 mAh/g, and the capacity retention after 30 cycles was 95.1%, and the heat generation starting temperature was 161° C.

Example 6

LiAl$_{0.01}$Co$_{0.975}$Mg$_{0.01}$Zr$_{0.005}$O$_2$ was obtained in the same manner as in Example 2 except that a mixture of 191.99 g of cobalt hydroxide with 76.27 g of a lithium carbonate powder, and as an aqueous solution, an aqueous solution of a carboxylate having a pH of 9.7, obtained by adding 6.21 g of a zirconium ammonium carbonate (NH$_4$)$_2$[Zr(CO$_3$)$_2$(OH)$_2$] aqueous solution having a Zr content of 15.1 wt % to an aqueous solution of a citrate having 4.86 g of aluminum citrate, 1.97 g of magnesium carbonate and 7.92 g of citric acid dissolved in 59.04 g of water, were used. The press density of the lithium-containing composite oxide powder was 3.08 g/cm$^3$. Further, by using the lithium-containing composite oxide powder, in the same manner as in Example 1, a positive electrode body was produced, batteries were assembled, and the battery characteristics were measured. As a result, the initial weight capacity density of the positive electrode layer was 162 mAh/g, the capacity retention after 30 cycles was 99.2%, and the heat generation starting temperature was 174° C.

Example 7

12.39 g of a zirconium ammonium carbonate (NH$_4$)$_2$[Zr(CO$_3$)$_2$(OH)$_2$] aqueous solution having a Zr content of 15.1 wt % was added to a solution having 6.03 g of commercial aluminum lactate, 1.97 g of magnesium carbonate and 10.77 g of citric acid dissolved in 48.79 g of water to obtain an aqueous solution of a citrate having a pH of 9.5, which was added to 190.61 g of cobalt hydroxide obtained by the method in Example 1 to obtain a slurry. The obtained slurry was dehydrated in a dryer at 120° C. for 2 hours and mixed with 76.12 g of the same lithium carbonate as one used in Example 1, and the mixture was fired at 950° C. for 12 hours to obtain LiAl$_{0.01}$Co$_{0.97}$Mg$_{0.01}$Zr$_{0.01}$O$_2$. The press density of the lithium-containing composite oxide powder was 3.08 g/cm$^3$. Further, by using the lithium-containing composite oxide powder, in the same manner as in Example 1, a positive electrode body was produced, batteries were assembled, and the battery characteristics were measured. As a result, the initial weight capacity density of the positive electrode layer was 160 mAh/g, the capacity retention after 30 cycles was 99.1%, and the heat generation starting temperature was 171° C.

INDUSTRIAL APPLICABILITY

According to the present invention, a process for producing a lithium-containing composite oxide for a positive electrode for a lithium secondary battery, which has a large volume capacity density and high safety and is excellent in the charge and discharge cyclic durability, a positive electrode for a lithium secondary battery containing the produced lithium-containing composite oxide such as a lithium-cobalt composite oxide, and a lithium secondary battery, are provided.

The entire disclosure of Japanese Patent Application No. 2004-144846 filed on May 14, 2004 including specification, claims and summary is incorporated herein by reference in its entirety.

What is claimed is:

1. A process for producing a lithium-containing composite oxide for a lithium secondary battery comprising:
    impregnating an N element source powder with an aqueous solution comprising a carboxylic acid having two or more carboxylic acid groups or carboxylic acid groups and hydroxyl groups and an M element or its salt;
    drying a slurry of the N element source powder impregnated with the aqueous solution comprising a carboxylic acid having two or more carboxylic acid groups or carboxylic acid groups and hydroxyl groups and an M element or its salt;
    mixing a lithium source, the dried slurry of the N element impregnated with the carboxylic acid and M element and optionally, a fluorine source; and
    firing the mixture at from 950° C. to 1050° C.;
wherein
    the lithium-containing composite oxide is represented by the formula:

wherein
    N is at least one element selected from the group consisting of Co, Mn and Ni,
    M is at least one element selected from the group consisting of Sn, Zn, Al, alkaline earth metal elements, and transition metal elements other than N,
    $0.9 \leq p \leq 1.1$,
    $0.97 \leq x < 1.00$,
    $0 < y \leq 0.03$,
    $1.9 \leq z \leq 2.1$,
    $x+y=1$,
    $0 \leq a \leq 0.02$,
    the N element source powder has an average particle size (D50) of from 2 to 20 μm, and
    the M element and optionally fluorine are present on the surface of particles of the lithium-containing composite oxide.

2. The process according to claim 1, wherein the carboxylic acid is a carboxylic acid having from 2 to 8 carbon atoms.

3. The process according to claim 2, wherein the carboxylic acid is at least one member selected from the group consisting of citric acid, lactic acid, oxalic acid and tartaric acid.

4. The process according to claim 1, wherein the aqueous solution comprising a carboxylic acid or its salt has a pH of from 2 to 12.

5. The process according to claim 1, wherein
    the N element source powder is impregnated with an aqueous solution of M element salt of the carboxylic acid,
    dried to remove water,
    then dryly mixed with a lithium source powder, and optionally, the fluorine source, and the obtained powder mixture is fired at from 950 to 1050° C. in an oxygen- containing atmosphere.

6. The process according to claim 1, wherein
the N element source powder is impregnated with an aqueous solution of M element salt of the carboxylic acid in the presence of a lithium source powder, and optionally, the fluorine source,
dried to remove water, and
the powder mixture thus obtained is fired at from 950 to 1050° C. in an oxygen-containing atmosphere.

7. The process according to claim 1, wherein the M element is at least one member selected from the group consisting of Ti, Zr, Hf, Nb, Ta, Mg, Sn, Zn and Al.

8. The process according to claim 7, wherein
the M element comprises Al and Mg,
an Al/Mg atomic ratio is from 1/3 to 3/1, and $0.005 \leqq y \leqq 0.025$.

9. The process according to claim 7, wherein
the M element comprises Mg and M2 wherein M2 is at least one element selected from the group consisting of Ti, Zr, Ta and Nb, the M2/Mg atomic ratio is from 1/40 to 2/1, and $0.005 \leqq y \leqq 0.025$.

10. The process according to claim 1, wherein the lithium-containing composite oxide powder comprises,
an integral breadth of a diffraction peak on (110) plane in the vicinity of $2\theta=66.5\pm1°$ from 0.08 to 0.14° as measured by means of X-ray diffraction in which CuKα is used as a radiation source,
a surface area from 0.2 to 0.6 $m^2/g$, and
a heat generation starting temperature is at least 160° C.

11. A process for producing a lithium-containing composite oxide for a lithium secondary battery according to claim 1, wherein
a solid/liquid ratio of the slurry obtained by impregnating the N element source powder with the aqueous solution of the M element salt of the carboxylic acid is from 50/50 to 90/10.

* * * * *